May 16, 1961  R. F. HUYS ET AL  2,984,569

MANUFACTURE OF PHOTOGRAPHIC FILMS

Filed May 18, 1955

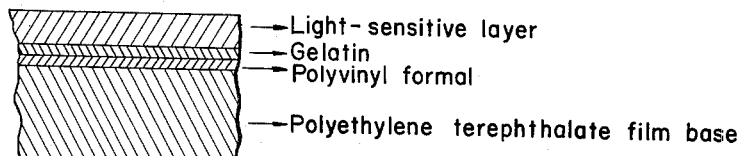

- Light-sensitive layer
- Gelatin
- Polyvinyl formal
- Polyethylene terephthalate film base

*Fig. 1*

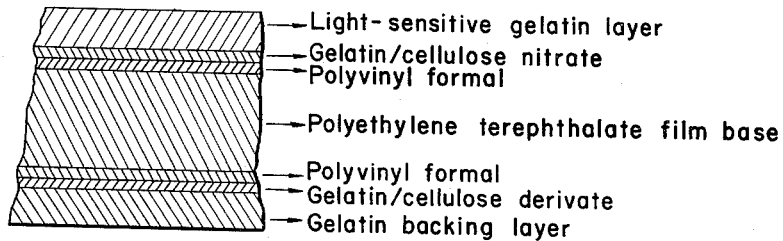

- Light-sensitive gelatin layer
- Gelatin/cellulose nitrate
- Polyvinyl formal
- Polyethylene terephthalate film base
- Polyvinyl formal
- Gelatin/cellulose derivate
- Gelatin backing layer

*Fig. 2*

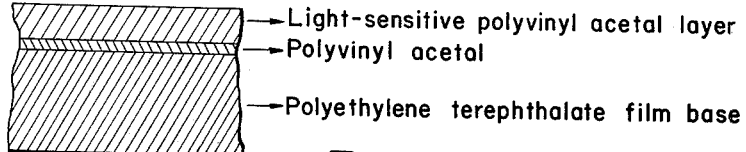

- Light-sensitive polyvinyl acetal layer
- Polyvinyl acetal
- Polyethylene terephthalate film base

*Fig. 3*

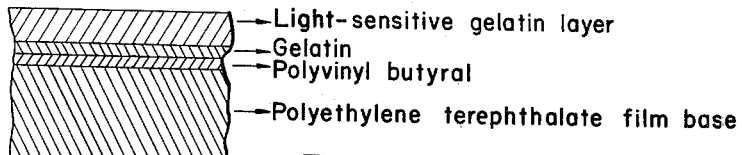

- Light-sensitive gelatin layer
- Gelatin
- Polyvinyl butyral
- Polyethylene terephthalate film base

*Fig. 4*

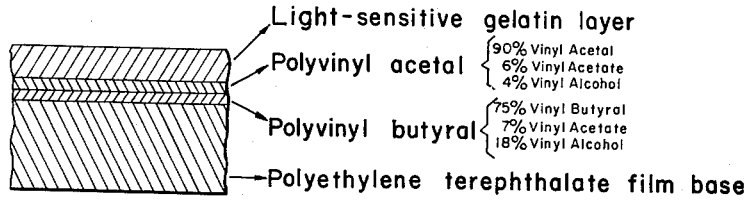

- Light-sensitive gelatin layer
- Polyvinyl acetal { 90% Vinyl Acetal, 6% Vinyl Acetate, 4% Vinyl Alcohol }
- Polyvinyl butyral { 75% Vinyl Butyral, 7% Vinyl Acetate, 18% Vinyl Alcohol }
- Polyethylene terephthalate film base

*Fig. 5*

INVENTORS
ROGER FLORIMOND HUYS
SERGE PIETER HENDRICX

BY

AGENT

United States Patent Office
2,984,569
Patented May 16, 1961

2,984,569

MANUFACTURE OF PHOTOGRAPHIC FILMS

Roger Florimond Huys and Serge Pieter Hendricx, Mortsel-Antwerp, Belgium, assignors to Gevaert Photo-Producten N.V., Mortsel-Antwerp, Belgium, a Belgian company Filed May 18, 1955, Ser. No. 509,333

Claims priority, application Great Britain May 19, 1954

6 Claims. (Cl. 96—87)

This invention relates to the manufacture of photographic films, especially films having a polyester film base.

It is known to make photographic films, the base of which consists of high-molecular linear polyesters, such as condensation products of terephthalic acid and diols, with a subbing layer of copolymers of vinylidene chloride or a layer of polyesters with a well-defined molecular weight. The composition of solutions from which these layers are cast is complicated, and the subbing layer itself requires special after-treatments, such as stretching, in order to ensure a perfect adhesion of the film base to the subbing layer.

It is an object of the present invention to make photographic films with high-molecular polyester as a film base.

Another object of our invention is to improve the surface properties of polyester films in such manner that the film can be coated with a hydrophilic colloid layer, with an enhanced degree of adhesion between the polyester base and said layer.

A further object of our present invention is to provide a photographic film in which the light-sensitive emulsion layer firmly adheres to the film base.

Further objects will be apparent from the following description.

According to the present invention, the above objects can be accomplished by applying to a film of a highly polymeric ester of a dicarboxylic acid and a dihydric alcohol a thin coating of a polyvinyl acetal from a solution of same, preferably containing a solvent for the polyester film base.

Thus, our invention deals with the manufacture of a photographic film including a film base of linear polyester, a hydrophilic light-sensitive emulsion layer, and therebetween one or more polyvinyl acetal layers coated from solutions, preferably containing a solvent for the polyester film base.

It is a special feature of the invention that the presence of this solvent permits the use of various polyvinyl acetals, such as polyvinyl formal, polyvinyl acetal, and polyvinyl butyral, including those with pronounced hydrophilic as well as those with less hydrophilic properties. The quantity of solvent for the polyester film base amounts to 50–200% of the polyvinyl acetal present.

It is to be noted that the choice of polyvinyl acetal solutions, the action of which is not supported by a solvent which slightly affects the polyester film base, is very restricted. Practically, only hydrophilic polyvinyl butyral containing 10% free OH as vinyl alcohol is suitable without solvents for the polyester film base. However, this polyvinyl butyral adheres much better to the film base by adding a solvent for the polyester film base.

The polyvinyl acetals according to our invention may contain in their polymer chain up to 10% vinylacetate and 5 to 50% hydroxyl groups calculated as vinyl alcohol, the remaining being present as vinyl acetal units.

The polyvinyl acetal may be obtained by partially or completely saponifying polyvinyl acetate and by reacting the greater part of the free OH groups, for instance, with formaldehyde, acetaldehyde, butyraldehyde, or glyoxal. Mixed polyvinyl acetals containing the prescribed quantity of OH groups and acetate groups may, according to the present invention, also be used as subbing layers.

Polyvinyl butyral suited for subbing layers without addition of a solvent for the polyester film base may be obtained by reacting butyralaldehyde with polyvinyl alcohol or saponified polyvinyl acetate until removal of at least 90% of the acetate groups. The reaction of the aldehyde is regulated so that 10% to 30% of the hydroxyl groups remain free, whereby the polyvinyl butyral obtained shows a certain water-sensitivity. Alternatively, the water-sensitivity may be regulated by the degree of polymerization of the polyvinyl butyral.

Suitable solvents for the film base, which may be added to the polyvinyl acetal solutions, are monophenols, such as phenols, cresols, chlorophenols, and nitrophenols, and polyphenols, such as resorcinol, pyrogallol, homopyrocatechol.

A particularly effective compound is chloral hydrate which due to its great water-solubility may easily be removed from the polyvinyl acetal layer already formed. Additions, for instance, of polyvinyl or polyacryl polymers or copolymers may be used in order to regulate the gel formation.

Auxiliary adhesive layers of gelatin, polyvinyl alcohol, polyvinyl acetate, cellulose esters and ethers, and their mixtures may be applied, for instance, between the light-sensitive gelatin layer and the subbing layer of polyvinyl acetal.

The specification is accompanied by a drawing in which:

Figs. 1, 2, and 4 illustrate sectional views of three modifications of a film according to the invention, all showing an auxiliary adhesive layer between a polyvinyl acetal layer and the light-sensitive emulsion layer;

Fig. 3 illustrates, in a sectional view of another modification of a film, a polyvinyl acetal layer uniting the emulsion layer and the polyester film base; and Fig. 5 illustrates, in a sectional view of still another modification of a film, a double polyvinyl acetal layer, whereby the layer adjacent to the emulsion layer is more water-sensitive and does not contain a solvent for the polyester film base.

The following examples illustrate the present invention without limiting, however, the scope thereof.

*Example 1*

A polyethylene terephthalate film base is coated with a 2% solution of polyvinyl formal in ethylene chloride to which 2% m-cresol, i.e. as much m-cresol as polyvinyl formal, is added. After drying until the ethylene chloride solvent is removed, the film base, provided with the subbing layer, is washed for 10 minutes in methanol to remove the m-cresol, and dried. A second subbing layer of the following composition is now applied in the usual way:

| | Percent |
|---|---|
| Gelatin | 0.70 |
| Water | 2.00 |
| Salicylic acid | 0.35 |
| Methanol | 64.00 |
| Acetone | 32.95 |

Then, a light-sensitive gelatin silver bromide emulsion layer is applied. After drying, the light-sensitive layer adheres quite satisfactorily before, during, and after development.

*Example 2*

In a solution of 2 gm. polyvinyl formal in 100 cu. cm. ethylene chloride are dissolved 2 gm. chloralhydrate. A polyethylene terephthalate film is coated on both sides with a layer of that solution. After sufficiently drying, the film is washed for 15 minutes in flowing water, and dried. On both sides of the subbing layer thus obtained, an auxiliary subbing layer of the following composition is applied:

| | |
|---|---|
| Gelatin | gm__ 0.6 |
| Cellulose nitrate | gm__ 0.4 |
| Ethylene chlorhydrin | cu. cm__ 20 |
| Methanol | cu. cm__ 40 |
| Methylene chloride | cu. cm__ 40 |

A light-sensitive gelatin silver bromide emulsion layer is applied to one side of this multilayer material, and a gelatin backing layer to the other side. Both the light-sensitive layer and the gelatin layer adhere satisfactorily to the film base, in a dry as well as wet state, before, during, and after development.

*Example 3*

2.5 gm. chloral hydrate are dissolved in a solution of 3 gm. polyvinyl acetal in 100 cu. cm. ethylene chloride. A polyethylene terephthalate film is coated with this solution on one side. After drying and without washing, there is applied thereto a light-sensitive silver bromide layer containing polyvinyl acetal as a binding agent. The film is then dried. The light-sensitive layer adheres quite satisfactorily to the film base.

*Example 4*

3 gm. o-chlorophenol are mixed with a solution of 3 gm. polyvinyl butyral in 100 cu. cm. dioxane. This solution is applied to one side of a polyethylene terephthalate film. After moderate drying, the film is led through a bath of carbon tetrachloride and left in contact with this liquid for about 15 minutes. After drying, the usual subbing layer and a light-sensitive layer are applied as described in Example 1. Both layers adhere quite satisfactorily, in dry and wet state, to the film base.

*Example 5*

A 10% solution was made of a polyvinyl butyral, containing 2% vinyl acetate and 18% vinyl alcohol, the rest being vinyl butyral, in a mixture of 85 parts methylene chloride and 15 parts ethyl alcohol. This solution was applied to a film support of polyethylene terephthalate by means of a coating roll, and dried at 70° C. A gelatin dispersion of the following composition

| | Percent |
|---|---|
| Gelatin | 0.70 |
| Water | 2.00 |
| Salicylic acid | 0.35 |
| Methyl alcohol | 64.00 |
| Acetone | 32.95 | was applied in the usual way to the polyvinyl butyral subbing layer. A light-sensitive gelatin-silver bromide layer was applied to this substratum and dried.

The emulsion adhered quite well to the subbed polyester film support both before and after developing.

*Example 6*

A light-sensitive polyvinyl acetal silver bromide layer was coated directly on a substratum of polyvinyl butyral containing 20% vinyl alcohol and applied to a film support consisting of polyethylene terephthalate.

The emulsion adhered quite well to the high-molecular polyester film support both before and after developing.

We claim:

1. A photographic film element including a film base composed of a linear high-polymeric ester of ethylene glycol and terephthalic acid, a layer of a polyvinyl butyral on at least one surface of the film base, the polyvinyl butyral being composed of 10–30% vinyl alcohol, 0–10% vinyl acetate, and 60–90% vinylbutyral, expressed in percentages of monomeric elements in the polymer, a gelatin layer on said polyvinyl butyral layer, and a gelatin silver halide layer on said gelatin layer.

2. A photographic film element including a film base composed of a linear high polymeric ester of ethylene glycol and terephthalic acid, two adjacent layers of a high molecular weight polyvinyl acetal on at least one surface of the film base, the one of said adjacent layers immediately on the film base constituting a primary subbing layer, the other adjacent layer being a secondary subbing layer, a gelatin silver halide emulsion layer being provided on the secondary subbing layer, the polyvinyl acetal being selected from the group consisting of polyvinyl formal, polyvinyl acetaldehyde acetal, and polyvinyl butyral, the polyvinyl acetal being composed of at least 50% vinyl acetal, 5 to 50% vinyl alcohol, and no more than 10% vinyl acetate, expressed in percentages of monomeric elements of the polymer, the primary polyacetal layer having a lower hydrophilic character than the secondary adjacent polyvinyl acetal layer.

3. A photographic film element comprising a film base composed of a linear high polymeric ester of ethylene glycol and terephthalic acid, at least a single primary subbing layer of a high molecular weight polyvinyl acetal selected from the group consisting of polyvinyl formal, polyvinyl acetaldehyde acetal, and polyvinyl butyral, the polyvinyl acetal being composed of at least 50% vinyl acetal, 5 to 50% vinyl alcohol, and no more than 10% vinyl acetate, expressed in percentages of monomeric elements of the polymer, the polyvinyl acetal layer being provided on at least one surface of the film base and constituting a primary subbing layer, a secondary subbing layer having a more hydrophilic character than the primary subbing layer and containing a mixture of a hydrophilic polyvinyl acetal and gelatin, and a light-sensitive silver halide emulsion layer with a binding agent selected from the group consisting of gelatin and polyvinyl acetal, provided on the secondary subbing layer.

4. A photographic film element comprising a film base composed of a linear high polymeric ester of ethylene glycol and terephthalic acid, at least a single subbing layer of a high molecular weight polyvinyl acetal, and a light-sensitive silver halide emulsion layer in a hydrophilic polymeric binding agent, the high molcular weight polyvinyl acetal being selected from the group consisting of polyvinyl formal, polyvinyl acetaldehyde acetal, and polyvinyl butyral, the silver halide emulsion layer being provided on the subbing layer, the polyvinyl acetal being composed of at least 50% vinyl acetal, 5 to 50% vinyl alcohol, and no more than 10% vinyl acetate, expressed in percentages of monomeric elements of the polymer, the polyvinyl acetal layer being provided on at least one surface of the film base.

5. A photographic film element comprising a film base composed of a linear high polymeric ester of ethylene glycol and terephthalic acid, at least a single primary subbing layer of a high molecular weight polyvinyl acetal selected from the group consisting of polyvinyl formal, polyvinyl acetaldehyde acetal, and polyvinyl butyral, the polyvinyl acetal being composed of at least 50% vinyl acetal, 5 to 50% vinyl alcohol, and no more than 10% vinyl acetate, expressed in percentages of monomeric elements of the polymer, the polyvinyl acetal layer being provided on at least one surface of the film base, a gelatin secondary subbing layer provided on the polyvinyl acetal layer, and a light-sensitive silver halide emulsion layer provided on the gelatin secondary subbing layer.

6. A photographic film element comprising a film base composed of a linear high polymeric ester of ethylene glycol and terephthalic acid, at least a single primary subbing layer of a high molecular weight polyvinyl acetal selected from the group consisting of polyvinyl formal, poylvinyl acetaldehyde acetal, and polyvinyl butyral, the polyvinyl acetal being composed of at least 50% vinyl acetal, 5 to 50% vinyl alcohol and no more than 10% vinyl acetate, expressed in percentages of monomeric elements of the polymer, the polyvinyl acetal layer being provided on at least one surface of the film base, a secondary subbing layer provided on the polyvinyl acetal layer containing a mixture of 60% gelatin and 40% cellulose nitrate, and a light-sensitive silver halide emulsion layer provided on the secondary subbing layer.

References Cited in the file of this patent

UNITED STATES PATENTS

| | | |
|---|---|---|
| 2,110,496 | Babcock | Mar. 8, 1938 |
| 2,146,907 | Nadeau et al. | Feb. 14, 1939 |
| 2,216,735 | Carothers | Oct. 8, 1940 |
| 2,245,218 | Murray et al. | June 10, 1941 |
| 2,462,151 | Woodward | Feb. 22, 1949 |
| 2,698,240 | Alles et al. | Dec. 28, 1954 |

FOREIGN PATENTS

| | | |
|---|---|---|
| 488,535 | Canada | Dec. 2, 1952 |
| 642,505 | Great Britain | Sept. 6, 1950 |